(12) United States Patent
Matsumoto et al.

(10) Patent No.: US 11,499,111 B2
(45) Date of Patent: Nov. 15, 2022

(54) SLIDING MEMBER

(71) Applicant: TAIHO KOGYO CO., LTD., Toyota (JP)

(72) Inventors: Shinji Matsumoto, Miyoshi (JP); Yasunori Kabeya, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 0 days.

(21) Appl. No.: 17/311,440

(22) PCT Filed: Aug. 29, 2019

(86) PCT No.: PCT/JP2019/033904
§ 371 (c)(1),
(2) Date: Jun. 7, 2021

(87) PCT Pub. No.: WO2020/129320
PCT Pub. Date: Jun. 25, 2020

(65) Prior Publication Data
US 2022/0025290 A1    Jan. 27, 2022

(30) Foreign Application Priority Data

Dec. 17, 2018   (JP) .............................. JP2018-235153

(51) Int. Cl.
*C10M 111/04*    (2006.01)
*C10M 103/06*    (2006.01)
(Continued)

(52) U.S. Cl.
CPC ............. *C10M 111/04* (2013.01); *C09D 7/61* (2018.01); *C09D 7/68* (2018.01); *C09D 179/08* (2013.01);
(Continued)

(58) Field of Classification Search
CPC .......... C09D 179/08; C09D 7/61; C09D 7/68; C10M 111/04; C10M 103/06;
(Continued)

(56) References Cited

U.S. PATENT DOCUMENTS 5,700,093 A * 12/1997 Hiramatsu .............. F16C 33/20
384/294
2008/0159671 A1  7/2008 Leonardelli
(Continued)

FOREIGN PATENT DOCUMENTS

| CN | 1392932 A | 1/2003 |
| CN | 101201081 A | 6/2008 |

(Continued)

OTHER PUBLICATIONS

Notification of Reasons for Refusal dated Feb. 8, 2022 from the Japanese Patent Office in JP Application No. 2018-235153.
(Continued)

*Primary Examiner* — Pamela H Weiss
(74) *Attorney, Agent, or Firm* — Sughrue Mion, PLLC

(57) ABSTRACT

To provide a technique capable of realizing an appropriate wear resistance in a resin coating layer.
The sliding member of the present invention is a sliding member including a base layer and a resin coating layer formed on the base layer, wherein the resin coating layer is formed of a polyamide-imide resin as a binder, barium sulfate particles, molybdenum disulfide particles, and unavoidable impurities, wherein the resin coating layer is composed of a plurality of overcoated application layers, and wherein the plurality of application layers are different from each other in content of hard particles.

2 Claims, 2 Drawing Sheets

(51) Int. Cl.

| | |
|---|---|
| *C10M 107/44* | (2006.01) |
| *F16C 33/10* | (2006.01) |
| *C09D 7/61* | (2018.01) |
| *C09D 7/40* | (2018.01) |
| *C09D 179/08* | (2006.01) |
| *C10N 50/08* | (2006.01) |
| *F16C 9/02* | (2006.01) |

(52) U.S. Cl.
CPC ........ *C10M 103/06* (2013.01); *C10M 107/44* (2013.01); *F16C 33/10* (2013.01); *C10M 2201/0663* (2013.01); *C10M 2201/084* (2013.01); *C10M 2201/1006* (2013.01); *C10M 2217/0443* (2013.01); *C10N 2050/08* (2013.01); *F16C 9/02* (2013.01)

(58) Field of Classification Search
CPC ........ C10M 107/44; C10M 2201/0663; C10M 2201/084; C10M 2201/1006; C10M 2217/0443; F16C 33/10; F16C 9/02; F16C 3/06; F16C 33/1095; F16C 2202/54; F16C 2208/42; F16C 33/201; F16C 17/02; C10N 2050/08; C23C 28/00
See application file for complete search history.

(56) References Cited

U.S. PATENT DOCUMENTS

| | | | |
|---|---|---|---|
| 2008/0194437 A1* | 8/2008 | Murase | C10M 169/04 |
| | | | 508/108 |
| 2014/0303050 A1* | 10/2014 | Tomikawa | F16C 33/203 |
| | | | 508/108 |
| 2015/0018255 A1 | 1/2015 | Tomikawa et al. | |
| 2017/0081522 A1* | 3/2017 | Adam | C09D 7/61 |
| 2018/0118251 A1 | 5/2018 | Maeda | |

FOREIGN PATENT DOCUMENTS

| | | |
|---|---|---|
| CN | 102459544 A | 5/2012 |
| CN | 102782350 A | 11/2012 |
| CN | 103415604 A | 11/2013 |
| CN | 103827274 A | 5/2014 |
| CN | 105308339 A | 2/2016 |
| CN | 105874105 A | 8/2016 |
| CN | 105925347 A | 9/2016 |
| CN | 106321635 A | 1/2017 |
| EP | 2 157 135 A1 | 2/2010 |
| GB | 2521004 A | 6/2015 |
| JP | 6-155651 A | 6/1994 |
| JP | 2003-184855 A | 7/2003 |
| JP | 2003-254014 A | 9/2003 |
| JP | 2005-187617 A | 7/2005 |
| JP | 2013-072535 A | 4/2013 |
| JP | 5841607 B2 | 1/2016 |
| JP | 2016-205561 A | 12/2016 |
| JP | 2018-016844 A | 2/2018 |
| JP | 2018-35838 A | 3/2018 |
| WO | 2013/039177 A1 | 3/2013 |

OTHER PUBLICATIONS

International Preliminary Report on Patentability dated Mar. 22, 2021, issued by the International Professional Engineers Agreement in application No. PCT/JP2019/033904.
International Search Report for PCT/JP2019/033904 dated Oct. 15, 2019 [PCT/ISA/210].
Written Opinion for PCT/JP2019/033904 dated Oct. 15, 2019 [PCT/ISA/237].
Extended European Search Report dated Jul. 28, 2022 from the European Patent Office in EP Application No. 19899149.9.
Notification of Reasons for Refusal dated Aug. 2, 2022 from the Japanese Patent Office in JP Application No. 2018-235153.
Communication dated Jun. 13, 2022 from the Chinese Patent Office in Chinese Application No. 201980077032.2.
Dingzhu Wo, "Encyclopedia of Composites", Chemical Industry Press Co., Ltd., 2000 (28 pages total).

* cited by examiner

SLIDING MEMBER

CROSS REFERENCE TO RELATED APPLICATIONS

This application is a National Stage of International Application No. PCT/JP2019/033904 filed Aug. 29, 2019, claiming priority based on Japanese Patent Application No. 2018-235153 filed Dec. 17, 2018.

TECHNICAL FIELD

The present invention relates to a sliding member having a resin coating layer.

BACKGROUND ART

A sliding bearing in which adjustment particles and a plate-shaped solid lubricant are contained in a resin binder is known (see Patent Literature 1). Patent Literature 1 describes that the adjustment particles dam cracks and that the plate-shaped solid lubricant improves the seizure resistance.

CITATIONS LIST

Patent Literature
Patent Literature 1: JP 2013-72535 A

SUMMARY OF INVENTION

Technical Problems

However, Patent Literature 1 involves a problem of insufficient wear resistance.

The present invention has been made in view of the above-described problem, and an object thereof is to provide a technique capable of realizing appropriate wear resistance in a resin coating layer.

Solutions to Problems

In order to achieve the above object, the sliding member of the present invention is a sliding member including a base layer and a resin coating layer formed on the base layer, wherein the resin coating layer is formed of a polyamide-imide resin as a binder, barium sulfate particles, molybdenum disulfide particles, hard particles, and unavoidable impurities, is composed of a plurality of overcoated application layers, and is configured so that the plurality of application layers are different from each other in content of hard particles.

Since the resin coating layer contains hard particles, the wear resistance of the resin coating layer can be improved. Further, the compatibility and wear resistance can be adjusted for each application layer by making the plurality of application layers different from each other in content of the hard particles. For example, the initial compatibility can be improved by making the hard particle content of the outermost layer lower than those of the other application layers. On the contrary, the initial wear resistance can be improved by making the hard particle content of the outermost layer higher than those of the other application layers.

Further, the barium sulfate particles may have an average particle diameter of 0.3 μm or more and less than 0.7 μm. It could be confirmed that the frictional resistance between the sliding member and a counter shaft can be reduced by setting the average particle diameter of the barium sulfate particles to 0.3 μm or more and less than 0.7 μm. It could also be confirmed that the smoothness of the surface can be improved by setting the average particle diameter of the barium sulfate particles to 0.3 μm or more and less than 0.7 μm. Furthermore, it could be confirmed that it is optimal to set the average particle diameter of the barium sulfate particles to 0.3 μm or more and less than 0.7 μm, from the viewpoint of improving the seizure resistance.

DETAILED DESCRIPTION OF PREFERRED EMBODIMENTS

An embodiment of the present invention will be described in the following order.
(1) Structure of sliding member:
(2) Method for manufacturing sliding member:
(3) Other embodiments:

(1) Structure of Sliding Member

Figure 1:
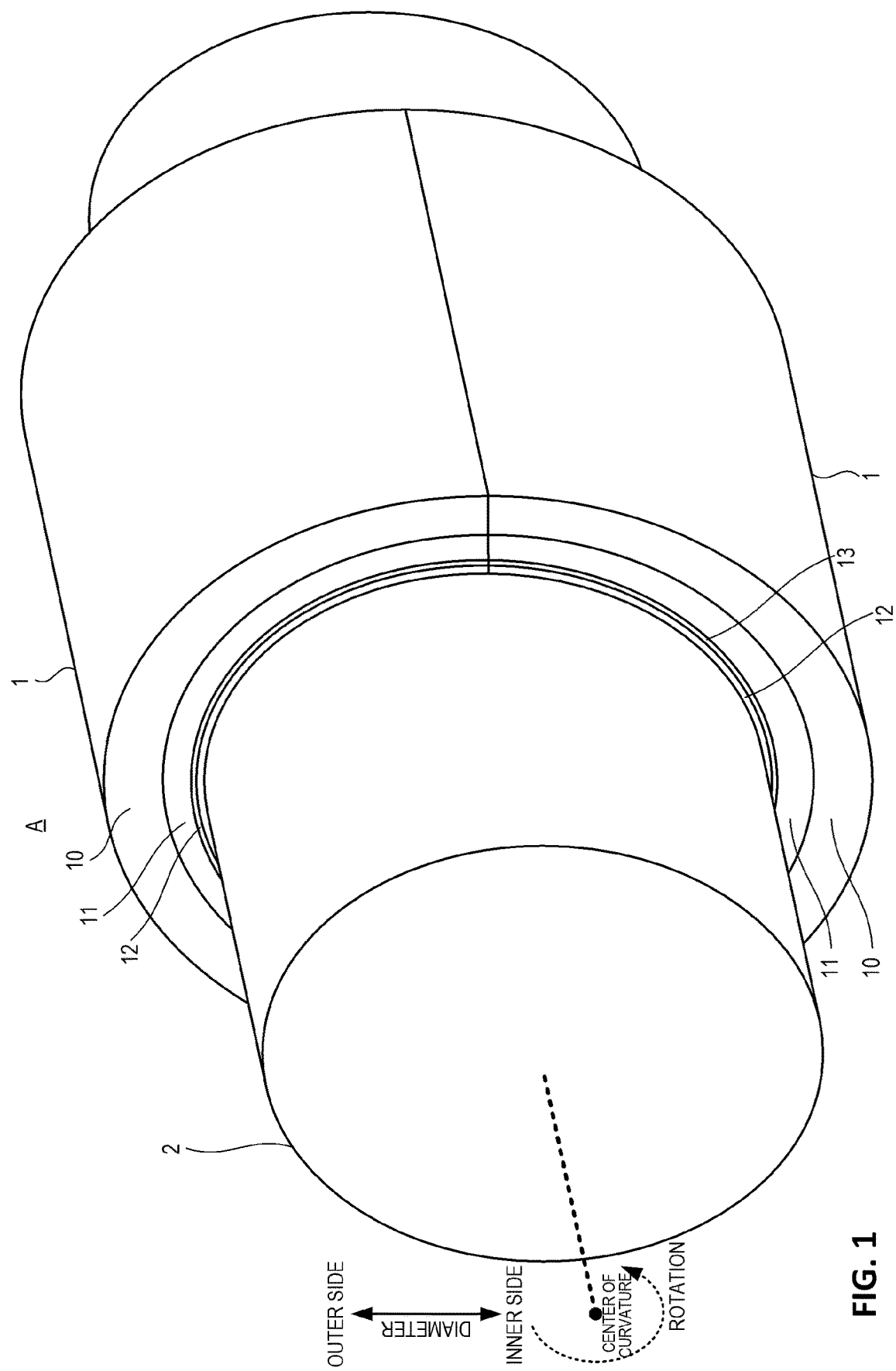
FIG. 1 is a perspective view of a sliding member according to an embodiment of the present invention.

FIG. 1 is a perspective view of a sliding member 1 according to one embodiment of the present invention. The sliding member 1 includes a back metal 10, a lining 11, and an overlay 12. The sliding member 1 is a half-shaped metallic member obtained by dividing a hollow cylinder into two equal parts in a diametrical direction, and has a semi-circular arc shape in cross section. By combining the two sliding members 1 so as to form a cylindrical shape, a sliding bearing A is formed. The sliding bearing A bears a cylindrical counter material 2 (crankshaft of an engine) in a hollow portion formed therein. The outer diameter of the counter material 2 is formed to be slightly smaller than the inner diameter of the sliding bearing A. A lubricating oil (engine oil) is supplied to a gap formed between the outer peripheral surface of the counter material 2 and the inner peripheral surface of the sliding bearing A. At that time, the outer peripheral surface of the counter material 2 slides on the inner peripheral surface of the sliding bearing A.

The sliding member 1 has a structure in which the back metal 10, the lining 11, and the overlay 12 are laminated in an order of being distant from the center of curvature. Therefore, the back metal 10 constitutes the outermost layer of the sliding member 1, and the overlay 12 constitutes the innermost layer of the sliding member 1. The back metal 10, the lining 11, and the overlay 12 each have a constant thickness in the circumferential direction. For example, the thickness of the back metal 10 is 1.1 mm to 1.3 mm, and the thickness of the lining 11 is 0.2 mm to 0.4 mm. For example, the back metal 10 is made of, for example, steel. The lining 11 is made of, for example, an Al alloy or a Cu alloy. The back metal 10 may be omitted.

The thickness of the overlay 12 is 6 μm. The thickness of the overlay 12 may be 2 to 15 μm, and is desirably 3 to 9 μm. Hereinafter, the term "inner side" means the curvature center side of the sliding member 1, and the term "outer side" means the side opposite to the center of curvature of the sliding member 1. The inner surface of the overlay 12 constitutes the sliding surface for the counter material 2.

Figure 2A:
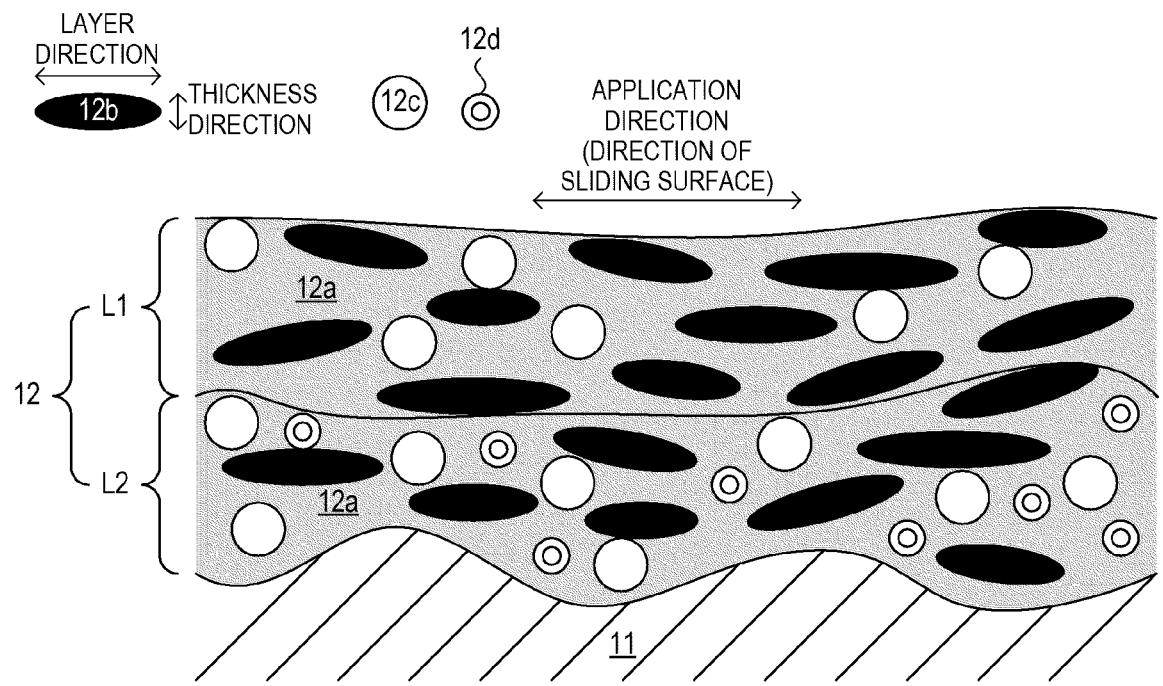
FIGS. 2A and 2B are schematic cross-sectional diagrams of an overlay.

FIG. 2A is a schematic cross-sectional diagram of the overlay 12. The overlay 12 is a layer laminated on the inner surface of the lining 11 and constitutes the resin coating layer of the present invention. The overlay 12 is formed of a binder resin 12a (gray), molybdenum disulfide particles 12b (black circles), barium sulfate particles 12c (white circles), SiC particles 12d (double circles) as hard particles, and unavoidable impurities. The binder resin 12a is a polyamide-imide resin.

In the present embodiment, the overlay 12 is composed of two overcoated application layers (outermost layer L1 and inner layer L2), and the outermost layer L1 and the inner layer L2 each have a film thickness of 3 μm. In the outermost layer L1 of the overlay 12, the volume fraction of the total volume of the molybdenum disulfide particles 12b is 30% by volume, the volume fraction of the total volume of the barium sulfate particles 12c is 15% by volume, and the volume fraction of the total volume of the SiC particles 12d is 0% by volume. The molybdenum disulfide particles 12b have a total volume 2 times the total volume of the barium sulfate particles 12c. The total volume of the binder resin 12a and the molybdenum disulfide particles 12b, the total volume of the barium sulfate particles 12c, and the total volume of the SiC particles 12d were calculated based on the masses of the binder resin 12a, the molybdenum disulfide particles 12b, the barium sulfate particles 12c, and the SiC particles 12d measured before mixing and their specific weights.

In the inner layer L2 of the overlay 12, the volume fraction of the total volume of the molybdenum disulfide particles 12b is 30% by volume, the volume fraction of the total volume of the barium sulfate particles 12c is 15% by volume, and the volume fraction of the total volume of the SiC particles 12d is desirably in the range of 0.7±0.2% by volume with a lower limit of 0.3% by volume and an upper limit of 1.3 to 1.5% by volume. The molybdenum disulfide particles 12b have a total volume 2 times the total volume of the barium sulfate particles 12c. The total volume of the binder resin 12a and the molybdenum disulfide particles 12b and the total volume of the barium sulfate particles 12c and the SiC particles 12d in the inner layer L2 were calculated based on the masses of the binder resin 12a, the molybdenum disulfide particles 12b, the barium sulfate particles 12c, and the SiC particles 12d measured before mixing and their specific weights.

The average particle diameter of the molybdenum disulfide particles 12b is 1.4 μm, the average particle diameter of the barium sulfate particles 12c is 0.6 μm, and the average particle diameter of the SiC particles 12d is 0.2 to 0.8 μm, desirably 0.5 μm. The average particle diameter of the molybdenum disulfide particles 12b is 2.33 times the average particle diameter of the barium sulfate particles 12c. The average particle diameters of the barium sulfate particles 12c and the molybdenum disulfide particles 12b were measured by MT3300II of MicrotracBEL Corp. Hereinafter, the value obtained by dividing the average particle diameter of the molybdenum disulfide particles 12b by the average particle diameter of the barium sulfate particles 12c is referred to as an average particle diameter ratio. The molybdenum disulfide particles 12b are layered particles, and the barium sulfate particles 12c are massive particles.

A sample in which the overlay 12 of the present embodiment described above was coated on a flat plate was prepared, and Rpk, Ra, the orientation rate, the transferred amount, the friction coefficient, the friction resistance reduction rate, and the seizure surface pressure were measured.

Rpk and Ra are surface roughnesses according to JIS B0671-2002 and JIS B0601-2001, respectively, which are surface roughnesses of the surface (sliding surface) of the overlay 12. The Rpk (0.08) was 0.162 μm when the cutoff value λc was 0.08 mm, and the Ra (0.8) was 0.151 μm when the cutoff value λc was 0.8 mm. Rpk and Ra were measured by Surf Coder SE-3400 of Kosaka Laboratory Ltd. The cutoff value λc is set to 0.08 mm, thereby making it possible to obtain the Rpk (0.08) showing the roughness after removal of the influence of the waviness of the groove having a period of about 0.08 mm formed on the surface of the lining 11.

The orientation rate of {002}, {004} and {008} of molybdenum disulfide in the outermost layer L1 in the overlay 12 of the present embodiment was 87%. In addition, the orientation rate of {002}, {004}, {006} and {008} of molybdenum disulfide in the outermost layer L1 in the overlay 12 of the present embodiment was 89.9%. The orientation rate is a proportion obtained by dividing the total intensity of the X-ray diffracted electron beams generated on the crystal planes {002}, {004} and {008}, or {002}, {004}, {006} and {008} of molybdenum disulfide by the total intensity of the diffracted electron beams generated on all the crystal planes. The orientation rate is an index showing how much the crystal planes {002}, {004} and {008}, or {002}, {004}, {006} and {008} are oriented in the direction orthogonal to the surface of the overlay 12. The intensities of the diffracted electron beams were measured by SmartLab of Rigaku Corporation. The higher the orientation rate, the higher the parallelism of the layer direction of the molybdenum disulfide particles 12b with respect to the sliding surface.

The film thickness of the outermost layer L1 among the plurality of overcoated application layers is set to 3 μm, thereby making it possible to suppress the amount of shrinkage of the binder resin 12a during curing of the outermost layer L1. Therefore, it is possible to reduce the unevenness between the site where the molybdenum disulfide particles 12b are present and the site where the molybdenum disulfide particles 12b are absent. Further, the film thickness of the outermost layer L1 is set to twice or less the average particle diameter of the molybdenum disulfide particles 12b, that is, 4 μm or less (preferably 1 to 2.5 μm), thereby making it possible to orient the layer direction of the layered molybdenum disulfide particles 12b in the application direction (direction of the sliding surface).

That is, the thickness direction of the molybdenum disulfide particles 12b can be oriented in the direction orthogonal to the application direction, that is, in the shrinkage direction of the binder during curing. As a result, the thickness of the molybdenum disulfide particles 12b in the shrinkage direction of the binder could be suppressed, and the unevenness between the site where the molybdenum disulfide particles 12b were present and the site where the molybdenum disulfide particles 12b were absent could be reduced.

Figure 2B:
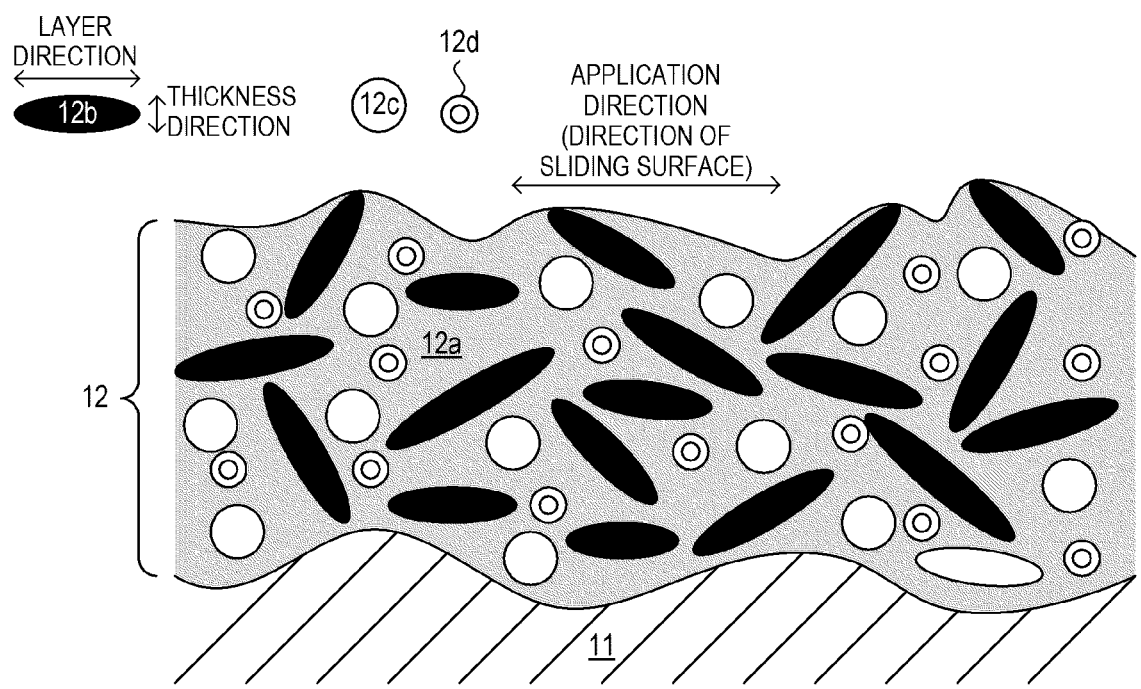

If the overlay 12 is composed of a single application layer as shown in FIG. 2B, the degree of freedom of rotation of the molybdenum disulfide particles 12b during application is increased, so that the layer direction of the molybdenum disulfide particles 12b can be oriented in a direction close to the direction orthogonal to the sliding surface. Thus, the height of the unevenness would increase due to the difference in amount of shrinkage between the molybdenum disulfide particles 12b and the binder resin 12a in the direction orthogonal to the sliding surface.

Further, the average particle diameter of the barium sulfate particles 12c is reduced, so that, even when the massive or spherical barium sulfate particles 12c whose orientation cannot be controlled, as shown in FIG. 2A, are used, the amount of the unevenness caused by the barium sulfate particles 12c can be reduced. As a result, the Rpk of the surface of the outermost layer L1 could be reduced. Further, the SiC particles 12d are not blended in the outermost layer L1, thereby making it possible to reduce the possibility that the surface of the overlay 12 may become uneven due to the SiC particles 12d near the surface. Further, the SiC particles 12d are not blended in the outermost layer L1, thereby making it possible to ensure the compatibility at the initial stage of use. Further, the SiC particles 12d are blended in the inner layer L2, thereby making it possible to improve the wear resistance during the progress of wear.

(2) Method for Manufacturing Sliding Member

The sliding member 1 was formed by sequentially performing (a) a half-shaped base material formation step, (b) a pre-application treatment step, (c) a first application step, (d) a second application step, (e) a drying step, and (f) a firing step. However, the manufacturing method for the sliding member 1 is not limited to the above-described steps.

(a) Half-Shaped Base Material Formation Step

The half-shaped base material formation step is a step of forming a half-shaped base material in which the back metal 10 and the lining 11 are joined. For example, the material for the lining 11 may be sintered on a plate material corresponding to the back metal 10, to form a base material in which the back metal 10 and the lining 11 are joined. Further, the back metal 10 and a plate material corresponding to the lining 11 may be joined by rolling, to form a base material in which the back metal 10 and the lining 11 are joined. Further, the base material in which the back metal 10 and the lining 11 are joined may be processed into a half shape by performing machining such as press working or cutting.

(b) Pre-Application Treatment Step

The pre-application treatment step is a surface treatment for improving the adhesion of the overlay 12 (resin coating layer) to the surface of the lining 11. For example, as the pre-application treatment step, a roughening treatment such as sandblasting may be performed, or a chemical treatment such as etching or chemical conversion treatment may be performed. The pre-application treatment step is preferably performed after degrease of the oil content of the half-shaped base material with a cleaning agent.

(c) First Application Step

The first application step is a step of applying the inner layer L2 of the overlay 12 onto the lining 11. In performing the first application step, an application liquid in which the molybdenum disulfide particles 12b and the barium sulfate particles 12c are mixed with a polyamide-imide binder resin is prepared. In addition, in order to improve the dispersibility of the molybdenum disulfide particles 12b and the barium sulfate particles 12c and to adjust the viscosity of the application liquid, a solvent such as N-methyl-2-pyrrolidone or xylene may be used as necessary.

The molybdenum disulfide particles 12b and the barium sulfate particles 12c are blended in the application liquid, so that the volume fraction of the total volume of the molybdenum disulfide particles 12b in the overlay 12 is 30% by volume, that the volume fraction of the total volume of the barium sulfate particles 12c therein is 15% by volume, and that the volume fraction of the total volume of the SiC particles 12d therein is 0% by volume. Further, the molybdenum disulfide particles 12b having an average particle diameter of 1.4 μm and the barium sulfate particles 12c having an average particle diameter of 0.6 μm are blended in a first application liquid.

The first application step is performed by adhering the first application liquid to a cylindrical application roll having a diameter smaller than the inner diameter of the lining 11 and rotating the application roll on the inner surface of the lining 11. By adjusting the roll gap between the application roll and the inner surface of the lining 11 and the viscosity of the application liquid, the first application liquid may be applied onto the inner surface of the lining 11 to a thickness that makes the film thickness 3 μm after the (g) firing step which will be described later.

(d) Second Application Step

Then, in the second application step, an application liquid is applied in the same manner as in the first application step. However, in the second application step, there is used an application liquid obtained by mixing the molybdenum disulfide particles 12b, the barium sulfate particles 12c, and the SiC particles 12d so that the volume fraction of the total volume of the molybdenum disulfide particles 12b in the overlay 12 is 30% by volume, that the volume fraction of the total volume of the barium sulfate particles 12c therein is 15% by volume, and that the volume fraction of the total volume of the SiC particles 12d therein is 0.7±0.2% by volume. A drying step which will be described later may be performed between the first application step and the second application step.

(e) Drying Step

The drying step is a step of drying the outermost layer L1 and the inner layer L2. For example, the outermost layer L1 and the inner layer L2 are dried at 40 to 120° C. for 5 to 60 minutes.

(f) Firing Step

Further, for example, the outermost layer L1 and the inner layer L2 were fired (cured) at 150 to 300° C. for 30 to 60 minutes.

The sliding member 1 is completed through the above steps.

(3) Other Embodiments

In the above embodiment, the SiC particles 12d are blended only in the inner layer L2, but the SiC particles 12d may be blended also in the outermost layer L1 to improve the wear resistance from the initial stage of use. In this case as well, the compatibility at the initial stage of use can be ensured by making the content of the SiC particles 12d in the outermost layer L1 lower than the content of the SiC particles 12d in the outermost layer L1. On the contrary, the content of the SiC particles 12d in the outermost layer L1 may be made higher than the content of the SiC particles 12d in the outermost layer L1 to improve the wear resistance at the initial stage of use. Further, the number of application layers may be 3 or more.

In the above embodiment, the sliding members 1 constituting the sliding bearing A for bearing the crankshaft of an engine have been illustrated, but a sliding bearing A for another purpose may be formed by the sliding members 1 of the present invention. For example, a radial bearing such as a transmission gear bush or a piston pin bush/boss bush may be formed by the sliding member 1 of the present invention. Furthermore, the sliding member of the present invention may be used in thrust bearings, various washers, or swash plates for car air-conditioner compressors.

REFERENCE SIGNS LIST

1 Sliding member
2 Counter material

10 Back metal
11 Lining
12 Overlay
12*a* Binder resin
12*b* Molybdenum disulfide particles
12*c* Barium sulfate particles
12*d* SiC particles
A Bearing
L1 Outermost layer
L2 Inner layer

The invention claimed is:

1. A sliding member comprising a base layer and a resin coating layer formed on the base layer,
   wherein the resin coating layer comprising:
   a polyamide-imide resin as a binder;
   barium sulfate particles;
   molybdenum disulfide particles; and
   SiC particles as hard particles,
   wherein the resin coating layer is composed of an outermost layer and an inner layer, which are two overcoated application layers,
   wherein the SiC particles are blended in the outermost layer and the inner layer, and wherein the content of the SiC particles in the inner layer is 0.3 vol. % to 1.5 vol. %; and,
   wherein a content of the SiC particles in the outermost layer is lower than a content of the SiC particles in the inner layer.

2. The sliding member according to claim 1,
   wherein the barium sulfate particles have an average particle diameter of 0.3 μm or more and less than 0.7 μm.

* * * * *